United States Patent Office 2,882,250
Patented Apr. 14, 1959

2,882,250

PROCESS FOR PREPARING EPOXY RESIN MODIFIED PROTEINS AND COMPOSITIONS RESULTING THEREFROM

Edgar B. Baker, Belmont, Calif., assignor to Stauffer Chemical Company, a corporation of Delaware No Drawing. Application July 7, 1955
Serial No. 520,622

12 Claims. (Cl. 260—6)

This invention relates to certain reaction products of epoxide compounds with proteins. More particularly, it relates to enhancing the properties of proteins by reacting the proteins with compounds containing more than one epoxide group in a molecule.

In general, the preferred polyepoxides are prepared from the reaction of epicholorohydrin with polyfunctional alcohols or phenols. Polyepoxides can also be produced from the oxidation of polyunsaturates through the medium of hydrogen peroxide. Also they can be prepared by the dehydrohalogenation of halohydrins produced by action of a hypohalogen acid or salt upon a polyunsaturate. Presumably, the same polyepoxides can be obtained by direct oxidation of polyunsaturates with oxygen-containing gases. The exact method of preparation forms no part of the present invention and the requirement is for a compound to contain more than one epoxide group per molecule, which compounds are well known to those skilled in the art.

The proteins can be of animal or vegetable origin: soya, casein, gelatin and peanut proteins are typical examples. These proteins can be in an unseparated state such as soya meal, which is made from decorticated seed which has been deoiled by extraction or pressing or a combination process. Likewise, these proteins are often used in a compounded form with alkaline agents, defoamers and plasticizers. My invention has been applied to such a combination. Proteins can be modified by physical, chemical or enzymatic action and my invention can also be applied to these modified materials. The extraction process for separating the protein will result in varying properties in the recovered protein, and these varying grades can be reacted with the polyepoxides with success. Animal glue or gelatin is made in various grades, and is a preferred protein for reaction with the epoxide compounds. Proteins are sometimes partially depolymerized by enzymatic treatment, and these materials can be reacted with the epoxides. Proteins are sometimes modified by reaction with such agents as sulfonyl halides, organic acid anhydrides or halides or alkaline oxides. Under some circumstances, these chemically modified materials are useful starting materials. The monofunctional epoxides presumably react in a chemical manner very similar to the polyfunctional ones, and may be a minor or major component of the preferred reaction mixture containing the polyepoxides.

The proteins to which this invention is applicable are those that are soluble in an aqueous medium or that can be dissolved in this medium with the aid of alkali. It is a particular advantage of our discovery that such a medium can be used since obvious economic advantages accrue to its use. The protein-epoxide reaction takes place under alkaline conditions at a pH of above 8 and preferably above 8.5. Delayed reaction may take place during drying and ageing of the dry film. Specifically exempt from our invention are structural proteins such as natural or regenerated fibers, keratin or hides, although my invention may be used in the preparation of regenerated protein fibers.

When epoxides react with solid or dissolved proteins useful changes are induced by only 0.05–25% of the polyfunctional agent based on dry protein weight, and most desirably about 0.25–10% of the agent is required. The protein-epoxide reaction is competing with hydration of the epoxides to a glycol and this relatively low amount of modifying agent required is somewhat surprising on the basis of this side reaction. Since the proteins are much less expensive than the modifying agents, the use of such a small amount of reagent effects considerable economic advantage. Another advantage accruing to my process is that generally no separation will be required of modified protein, salts or other reaction products, although such separation might be desirable under special conditions.

It is generally known that halohydrins dehydrohalogenate under aqueous alkaline conditions to give epoxide compounds. Since my condensation conditions are the same, it is obvious to those skilled in the art that either polyepoxides or their halohydrin precursors can be used to react with the protein rather than the polyepoxides per se. Any reference to polyepoxides also includes polyhalohydrins, and the choice between the two materials depends upon availability or economic advantage as well as possible difference in chemical reactivity.

The exact mechanism of the reaction between proteins and epoxides when the latter are used in small amounts is not known. Studies indicate that epoxides in large amounts react with carboxy, primary amino, mercapto and phenolic groups. Many factors are important in determining the rate and extent of reaction of epoxides with the protein. In the case of linear proteins, the chemical reaction is probably primarily that of cross-linking between separate chains through reaction with terminal or non-terminal groups. With globular proteins, the cross-linking is probably more complex and intra-molecular reactions may occur to a larger extent than for linear ones. Many of the modifying agents are of low water solubility and will have to be intimately dispersed in order to get satisfactory reaction speeds. The agents of very low solubility react more slowly and give a more hydrophobic film than when a more water soluble epoxide or halohydrin is used.

Various polyepoxides, chloroepoxides or polyhalohydrins can be used within the intent of this invention. Epichlorohydrin or diglycidyl ether are pure compounds within the broad limits of my claims. The preferred compounds are polyepoxides or polyhalohydrins produced from reaction of polyhydric aliphatic or cycloaliphatic alcohols or polyhydric phenols with epichlorohydrin or analogs. Polyhalohydrins or polyepoxides produced by other methods can also be used.

A first preferred epoxide composition is prepared from the dehydrohalogenation of reaction products of epihalohydrins with polyhydric alcohols. The polyhalohydrin can contain chlorine, bromine or iodine. The general type of halohydrin ethers produced by reaction of polyhydric alcohols with these epihalohydrins is indicated in U.S. Patent 2,581,464. The dehydrohalogenation to the epoxides can be effected in a known manner, such as in the above patent, or in situ in the alkaline aqueous medium in which the condensation with the proteins is to be effected. Polyhydric alcohols can be the polyhydric alcohols as such, including ethylene glycol, propylene glycol, glycerol or polyhydric ether alcohols such as diglycerol, dipentaerythritol and the like. The epihalohydrins can be epichlorohydrin, epibromohydrin, or epiiodohydrin.

The second preferred class of condensates is from the reaction of polyfunctional phenols with epichlorohydrin, Under special conditions, these can be condensed to give halohydrin ethers of phenols or under aqueous alkaline conditions, they condense to give glycidyl ethers of phenols. Typical phenols that can be used are: resorcinol, bisphenol, hydroquinone, etc. These are thus mono- or polynuclear phenols.

*Preparation of complex ethers*

*Ether 1.*—Sorbitan monolaurate is commercially available as Span 20 from Atlas Powder Co. This is condensed with epichlorohydrin to produce a complex ether. 50 grams of Span 20 and 0.5 ml. boron fluoride ethyl ether (Eastman P4272) were mixed in an Erlenmeyer flask. These were heated to about 70° C. and epichlorohydrin (50 grams) was added portionwise while the reaction mixture was swirled and externally cooled. After the final addition, the mixture was heated to about 100° C. Total reaction time 3 hours.

A portion of this was dehydrohalogenated by first forming a mixture of the following proportions:

80 grams of above condensate
40 grams of ground sodium aluminate
200 ml. dioxane
2 ml. $H_2O$ This mixture was agitated on a hot plate in a wide mouth Erlenmeyer flask for 8 hours at a temperature of 85–90° C. Dioxane was added periodically to replace the slight evaporation loss. The solvent was removed, after filtration, by vacuum distillation. The oily material which remained was the desired product.

*Ether 2.*—To a quantity of 21 grams of ethylene glycol was added about five drops of the boron trifluoride ether described above and the mixture was heated to about 60° C. and 52 ml. of epichlorohydrin was added portionwise with cooling in the course of about 25 minutes. Average temperature about 85° C. This was allowed to react at 85–90° for one-half hour. Five grams of epichlorohydrin was lost by evaporation in the course of the condensation, so the mole ratio of epichlorohydrin to ethylene glycol was about 1.8:1.0. A portion of this was dehydrohalogenated in a manner analogous to ether No. 1.

*Ether 3.*—A complex ether was prepared in a manner analogous to ether 2, above, using about three moles of epichlorohydrin per mole of ethylene glycol. This was not dehydrohalogenated; however, for industrial application it might be desirable to remove the boron trifluoride in order to reduce the toxicity hazard.

*Ether 4.*—Thirty-seven grams of resorcinol and seventy-six ml. of epichlorohydrin were mixed and condensed at 50–70° C. temperature in the presence of aqueous caustic soda in a known manner. The oily material recovered was washed several times with water to remove excess caustic soda.

*Ether 5.*—Epon 562 is a resin intermediate manufactured by Shell Chemical Corp. by condensing glycerine with epichlorohydrin. The commercial material is an oil with an average molecular weight of about 300, and an epoxide equivalent weight of 140–165.

*Ether 6.*—Epon 828 is a condensation polymer marketed by Shell Chemical Corp. It is made from bisphenol and epichlorohydrin. Its average molecular weight is about 350 with an epoxide equivalent weight of 190–210.

Ethers 5 and 6 are well characterized and are available in large quantities so have been used in much of this work.

*Reaction of condensates with proteins*

The reaction of the complex ethers with proteins in solution is manifested by increase in viscosity of the protein solutions. If the solutions are kept for some time, gelation will sometimes take place. The reaction conditions can be varied as desired to give considerable variation in results. If the protein solution is used at room temperature, a reasonably long working life can be maintained before gelation takes place. At elevated temperatures, the working time is lowered considerably. Animal glue and gelatin are preferred proteins for use in the practice of this invention and more work has been done with these materials than with other proteins. Standard tests for viscosity and jelly strength of glue have been developed and revised by the National Association of Glue Manufacturers. The sample of gelatin used is tested at 6⅔% concentration on the same equipment that is used for testing the glue at 12.5% concentration. Viscosity is reported in absolute units, and jelly strength is reported on the basis of determinations under standard conditions.

*Reaction with casein*

A casein solution was prepared by dispersing casein in water with enough caustic soda to bring the pH to 10.7. Casein content was 20%. Ether 5 was added at the rate of 1.0%, 2.5% and 5.0% on a casein basis. After three hours at room temperature, the 5% mixture had jelled. After four hours, the 2.5% sample jelled; the 1% sample jelled overnight.

Comparable tests were run with ether 6 diluted 1:1 with toluene. These had jelled after standing overnight.

Thin layers (about ⅛ in. thick) of the samples prepared above were dried for ten days at 100° F. and ground to pass an 8 mesh screen and be retained on a 20 mesh screen. Samples of this ground product were dispersed in water to get some indication of chemical reaction that might change the sensitivity toward water. Two grams of the ground material were allowed to stand in contact with fifty grams of water at room temperature for five hours. At the end of this time, solids determinations were run on the swollen material by draining off the free water, drying in a 110° C. oven overnight and weighing. Solids on these samples were:

| Percent resin | Resin 5, percent | Resin 6, percent |
|---|---|---|
| 1 | 4.9 | 5.1 |
| 2.5 | 6.1 | 7.5 |
| 5.0 | 8.2 | 10.9 |

For control purposes, a run was made in the fashion described above using a material which contained no resin, and the solid determination yielded the figure 4.5%.

In another series of tests, casein was dispersed with a mixture of ammonia and caustic soda as follows:

200 parts casein
800 parts water
25 ml. 28% $NH_3$
30 ml. NaOH solution containing 0.2 gm. NaOH/ml.

Quantities of 4% and 8% of resin 6 (diluted 1:1 with toluene) were mixed well with the compounded casein mixture. Layers about ⅛ in. thick were poured and dried at 100° F. for five days. Each was ground and an 8–20 mesh fraction was dispersed with excess water at room temperature. The samples were shaken intermittently for a period of four hours. At the end of this time, the control had completely dispersed. The 4% resin sample had 6% solids; the 8% sample had 10.6% solids.

The ground compounded casein was allowed to sit for eight weeks at room temperature, and similar results were obtained.

*Reaction of condensates with soya protein and soya meal*

Chlorohydrin ether 3 prepared as above was reacted in low percentages with isolated soya protein dispersed with caustic soda. The soya was made up in the following proportions:

100 g. isolated protein
500 g. water
1 g. Na₂SO₃
20 ml. NaOH solution containing 0.2 g. NaOH/ml.
Final pH about 10.9; solids—16%.

The complex condensate was well mixed with the protein solution on the basis of 1.0, 2.5, 5.0 and 10% of solids. Some samples were poured in about ⅛ in. layers and dried at 100° F. while others were allowed to sit at room temperature for 24 hours. The room temperature samples had not jelled in this time. The dried protein films were ground to 8–20 mesh after four days. One gram samples were allowed to soak in 50 ml. of water for four hours, the free water drained off, and solids were determined as before:

Control: 4.0%
1% ether _____ 5.1
2.5% ether _____ 6.8
5.0% ether _____ 7.7
10.0% ether _____ 9.5

*Reactions of complex compounds with glue or gelatin*

There is no sharp distinction between glue and gelatin. Gelatin is sometimes considered as purified glue and is generally higher test. In the following tests, glue is tested at 12½% concentration and gelatin at 6⅔%. The preferred applications of this invention are with these materials. The reaction is easy to follow, as concentrated glue solutions are readily available; the solutions can be made alkaline, the resin added and the course of the reaction can be easily followed by checking the change of viscosity with time at a given temperature. If desired, the concentrated glue liquors can be diluted to 12.5% or 6⅔%, neutralized and viscosities determined on the diluted liquors in a standard viscosity pipet. A gain in viscosity indicates a chemical reaction with the protein, and portionwise addition of condensate can be made to produce the desired change.

*Example 1.*—A 115 jell gram glue with a viscosity of 46 millipoises was dissolved in water, and the pH was adjusted to 10.7 with aqueous caustic. The glue content after adjustment of pH was 23%. The solution was maintained at about 140° F. and 1% (based on glue) epichlorohydrin was added with agitation. At the end of 45 minutes the glue solution had jelled. More complex materials are preferable to epichlorohydrin because of lower toxicity, volatility and a more easily controlled reaction with glue.

*Example 2.*—Eighty pounds of glue was dissolved in 160 pounds of water and heated to about 140° F. in a kettle equipped with a heating jacket and agitator. Four hundred grams of caustic soda in five pounds of water was added to this solution to bring the pH to 8.8. The solution was maintained at an elevated temperature while periodic additions of ether 5 were made in the course of four hours. Total resin dosage was 0.8% based on glue weight. The viscosity of the concentrated liquor increased from 18 sec. to 30 sec. when measured in a No. 5 Zahn cup. The liquor was neutralized and dried. The glue viscosity increased from 91 millipoises to 189 millipoises, the jell strength decreased from 294 to 269 grams.

*Example 3.*—A gelatin was modified in a similar manner to Example 2, adding 0.5% by weight of ether 5 to about a 31% solution. The original viscosity at 6⅔% solids was 34 millipoises; final, 77 mps. The initial jell strength was 120 Bloom grams, and the final jell strength was the same.

*Example 4.*—A 38% solution of the glue of Example 1 with a pH of 10.0 was reacted with 10% ether 4. The solution jelled in 15 minutes.

*Example 5.*—The glue used in Example 1 was made into a 39% solution with a pH of about 9.8. Periodic additions of ether 3, the halohydrin, were made in the course of three hours and twenty minutes with a reaction temperature of 135–40° F. In the course of this time the total resin added was 1.6% of glue weight. The liquor viscosity increased from 14 sec. to 51 sec. in a No. 5 Zahn cup. The batch was neutralized 30 minutes after the last increment of condensate was added. The liquor was poured in a thin layer, jelled, transferred to a screen, and dried. Following drying the glue tested 86 mps.; 67 jellgrams.

*Example 6.*—The glue used in Example 1 was reacted at a pH of 10 with 1.1% ether 5 to increase viscosity to 95 mps. without affecting the jell test.

*Example 7.*—A glue with a viscosity of 56 mps., jell test of 118 mps. was reacted with 0.6% ether 5 to give a product of 95 mps.; 105 jell gram test.

*Example 8.*—An enzymatically degraded glue was made into a 38% solution with a pH of 10. This was reacted with 3.8% of resin 5. The viscosity increased from 20 to 95 mps. under this treatment. The jell strength of the original and modified glue was so low that it could not be measured accurately.

*Example 9.*—The glue used in Example 1 was condensed with 1.3% ether 2 in a solution with a pH of 10, 36% solids under conditions similar to prior reactions. At the end of this time the test of the neutral dry glue was 69 mps.; jell strength 92 j.g.

*Example 10.*—The glue used in Example 1 was reacted with 2% ether 6 used as a 50% solution in toluene, at a pH of 9.8. The dry glue had a viscosity of 79 mps., jell strength 47.

*Example 11.*—Four percent ether 1 was reacted with the glue of Example 1 under conditions similar to prior condensations. The modified glue had a viscosity of 113 mps.; a jell test of 83 grams.

*Example 12.*—About 1.5% of ether 2 was reacted with the glue of Example 1 under conditions similar to prior examples. The modified glue had a viscosity of 69 mps., a jell test of 92 grams.

In order to show the superiority of proteins modified in accordance with the present invention, various tests were made. The first test established the superiority of the modified proteins with respect to water resistance of plywood made with modified soya protein.

1/16" sliced yellow birch veneer of approximately 10.5% moisture content was used to fabricate six three-ply 12" x 12" panels. Monsanto's Lauxein 10-B, a soybean meal glue commonly used in the manufacture of plywood, was the adhesive used. The manufacturer's recommendations as to mixing procedure for conventional use was followed. Using these instructions, one large glue mix was prepared with the following correct proportions:

| Material | Proportions |
| --- | --- |
| 1. Lauxein 10-B (soya meal containing 51.5% protein). | 100 lbs. |
| 2. Water | 350 lbs. |
| 3. Lime | 3 lbs. of lime in 10 lbs. of water. |
| 4. Caustic soda | 7 pounds of caustic soda in 20 lbs. of water. |
| 5. Silicate of soda | 15 pounds. |
| 6. Mixture No. 64 | 2 lbs., 6½ ounces. |

The mix was then divided into three parts:

| Adhesive | Code | Description |
| --- | --- | --- |
| Control | UM | Unmodified. |
| Modified | M-10 | Protein Modifier added at rate of 10 ml./lb. of mixed glue (Ether 6). |

Immediately after mixing, two three-ply panels were made using each adhesive. The glue was applied to the veneer using a spread of 130 pounds per thousand feet of double glue line, a pressure of 200 pounds per square inch, closed assembly time of not over twenty minutes, and a press time of 20 hours at approximately 75° F.

After removal from the press, the panels were placed in a constant temperature-humidity room having an equilibrium moisture content of 9%.

At the end of ten days, the panels were removed for testing. One panel bonded with each adhesive was designated to be tested in accordance with conditions set forth in cyclic wet and dry test described in Commercial Standard CS35–49. Ten plywood shear test specimens were obtained from each panel and subjected to the cyclic wetting and drying, after which they were tested, while wet, in a shear testing machine. Ten shear test specimens were obtained from each of the remaining three panels and tested dry. Results are recorded in Table 1.

It is apparent that the protein modifier does definitely improve shear strength and, to a lesser extent, wood failure after cyclic wet and dry exposure. Specimens from the modified panels showed an average of strength values of 260, with an average wood failure of 7%. This is significantly superior to the 192 p.s.i. and no wood failure produced by specimens obtained from unmodified panels.

TABLE 1.—PLYWOOD SHEAR TEST RESULTS (AVERAGE OF TEN SPECIMENS) [1]

| Adhesive Mix | Dry | | | | After cyclic wet and dry | | | |
|---|---|---|---|---|---|---|---|---|
| | Shear Strength | | Wood failure | | Shear Strength | | Wood failure | |
| | Av., p.s.i. | Range, p.s.i. | Av., Percent | Range, Percent | Av., p.s.i. | Range, p.s.i. | Av., Percent | Range, Percent |
| UM | 483 | 445–540 | 44 | 20–65 | 192 | 175–210 | 0 | 0 |
| M-10 | 481 | 420–555 | 20 | 15–30 | 260 | 240–280 | 7 | 0–20 |

[1] Conducted in accordance with Commercial Standard CS35–49.

The modified proteins of the present invention are useful as flocculating or agglomerating agents in many fields of applications. Flocculation of mineral values, chalk, clays or milk of magnesia may be accelerated by the use of these agents alone or in conjunction with aluminum sulfate, chrome alum or iron salts. Such an agglomeration is generally effected to improve the separation of solids and water. These agglomerates are then separated from the bulk of the water through the influence of gravity which allows the suspended material to settle, or through the incorporation of air in the system which results in the solid material rising to the surface. In other cases the formation of agglomerates will improve the water-solids separation through improving the rate of filtration when this type of separation is used. In some cases, the solid-liquid separation will be effected in order to be able to reuse the water. In other cases, the suspended solids are valuable, or must be removed before the water is discharged into a public waterway.

Ordinary glue has been used to aid the settling of magnesium hydroxide in seawater magnesia plants, to aid the settling of "mud" in aluminum sulfate manufacture, in the processing of uranium ores and in the recovery of suspended solids in "white water" from paper mills. In such applications, a higher jell test glue is more effective than a lower grade glue, so less high grade glue is required to effect a given degree of flocculation than if a low grade glue were used. A 250 jell gram glue, for instance, might require about two-thirds as much to effect a certain settling rate as a 100 jell gram glue. The modified proteins I have discovered are more effective flocculants than the starting glue, and generally the modified materials are two or three times as effective.

As examples, the modified glues prepared in Examples 5 and 7 above were tested as flocculants with Attapulgus clay and magnesium hydroxide suspensions. These modified glues were compared with a glue testing 42 mps., 101 jg. All of the materials were added to the dispersions as 1% solutions; the reagent dosage is on total weight, and is calculated as parts/million (p.p.m.).

A 5% Attapulgus clay suspension was prepared by mixing the clay in distilled water in a blender. 200 milliliter aliquots were measured into 250 ml. stoppered graduated cylinders. Successive amounts of the glue and modified glues were added and the cylinders were inverted to mix well. After setting for five minutes, the clear effluent was measured, and the settling rate calculated in inches/hour.

SETTLING RATES (IN./HR.) CLAY SUSPENSIONS

| | 0 | 5 p.p.m. | 10 p.p.m. |
|---|---|---|---|
| Control | 9 | | |
| Example 5 | | 21 | 25 |
| Example 7 | | 25 | 31 |
| 101 gm. glue | | 19 | 20 |

In this application, Example 7 was superior to Example 5, which, in turn, was a better flocculant than regular glue.

A 0.6% suspension of magnesium hydroxide in sea water was treated in a similar manner to the above tests. 50 p.p.m. of either Ex. 5 or Ex. 7 gave a settling rate equivalent to about 125 p.p.m. of the 101 gram glue.

A high viscosity and low jelling tendency are recognized as desirable properties of liquid sizes and glues. Jell depressants are often added to reduce the normal jelling tendencies of glue. By preparing products with high viscosity compared to jell such as have been described in this invention, enhanced usefulnes of proteins has been realized.

I claim:

1. The process of modifying a protein selected from the class consisting of soya, casein, gelatin, peanut and animal glue protein comprising: dissolving said protein in water having a pH of at least 8.0; and thereafter adding thereto between about 0.05% and 25%, based upon the weight of said protein, of a material selected from the group consisting of (a) polyepoxides prepared by reacting a polyhydric phenol and an epihalohydrin from the group consisting of epichlorohydrin, epibromohydrin and epiiodohydrin and (b) polyhalohydrins prepared by reacting a polyol selected from the group consisting of polyhydric aliphatic alcohols and polyhydric cycloaliphatic alcohols with an epihalohydrin selected from the group consisting of epichlorohydrin, epibromohydrin and epiiodohydrin.

2. The process of claim 1 wherein the pH of said aqueous solution is at least about 8.5.

3. The process of claim 1 wherein the protein is animal glue.

4. The process of claim 1 wherein the protein is soya protein.

5. The process of claim 1 wherein the protein is casein.

6. The process of claim 1 wherein the protein is gelatin.

7. The process of claim 1 wherein the material designated (b) is first dehydrohalogenated and thereafter contacted with said protein to produce a modified protein.

8. The process of claim 7 wherein the polyol is sorbitan monolaurate and the epihalohydrin is epichlorohydrin.

9. The process of claim 7 wherein the polyol is ethylene glycol and the epihalohydrin is epichlorohydrin.

10. The process for modifying a protein selected from the class consisting of soya, casein, gelatin, peanut and animal glue protein comprising: dissolving said protein in an aqueous solution having a pH of at least about 8.0 and contacting said dissolved protein with the reaction product of ethylene glycol, boron trifluoride ether and epichlorohydrin.

11. The process for modifying animal glue protein comprising: dissolving said protein in an aqueous solution having a pH of at least about 8.0 and contacting said dissolved protein with the reaction product of glycerin and epichlorohydrin.

12. As a new composition of matter, the reaction product resulting when a protein selected from the class consisting of soya, casein, gelatin, peanut and animal glue protein is dissolved in an aqueous solution having a pH of at least about 8.0 and thereafter is added thereto between about 0.05% and 25%, based upon the weight of said protein, of a material selected from the group consisting of (a) polyepoxides prepared by reacting a polyhydric phenol and an epihalohydrin from the group consisting of epichlorohydrin, epibromohydrin and epiiodohydrin and (b) polyhalohydrins prepared by reacting a polyol selected from the group consisting of polyhydric aliphatic alcohols and polyhydric cycloaliphatic alcohols with an epihalohydrin selected from the group consisting of epichlorohydrin, epibromohydrin and epiiodohydrin.

References Cited in the file of this patent

UNITED STATES PATENTS

| 2,334,270 | Knowles | Nov. 16, 1943 |
| 2,581,464 | Zech | Jan. 8, 1952 |
| 2,594,293 | Cowan | Apr. 29, 1952 |
| 2,682,514 | Naps | June 29, 1954 |
| 2,682,515 | Naps | June 29, 1954 |
| 2,705,223 | Renfrew et al. | Mar. 29, 1955 |
| 2,707,177 | Skiff et al. | Apr. 26, 1955 |

OTHER REFERENCES

Narracott: "British Plastics," October 1951, pages 341–345.